Sept. 30, 1952   L. M. BUTLER   2,612,303
FISH STRINGER
Filed March 17, 1950
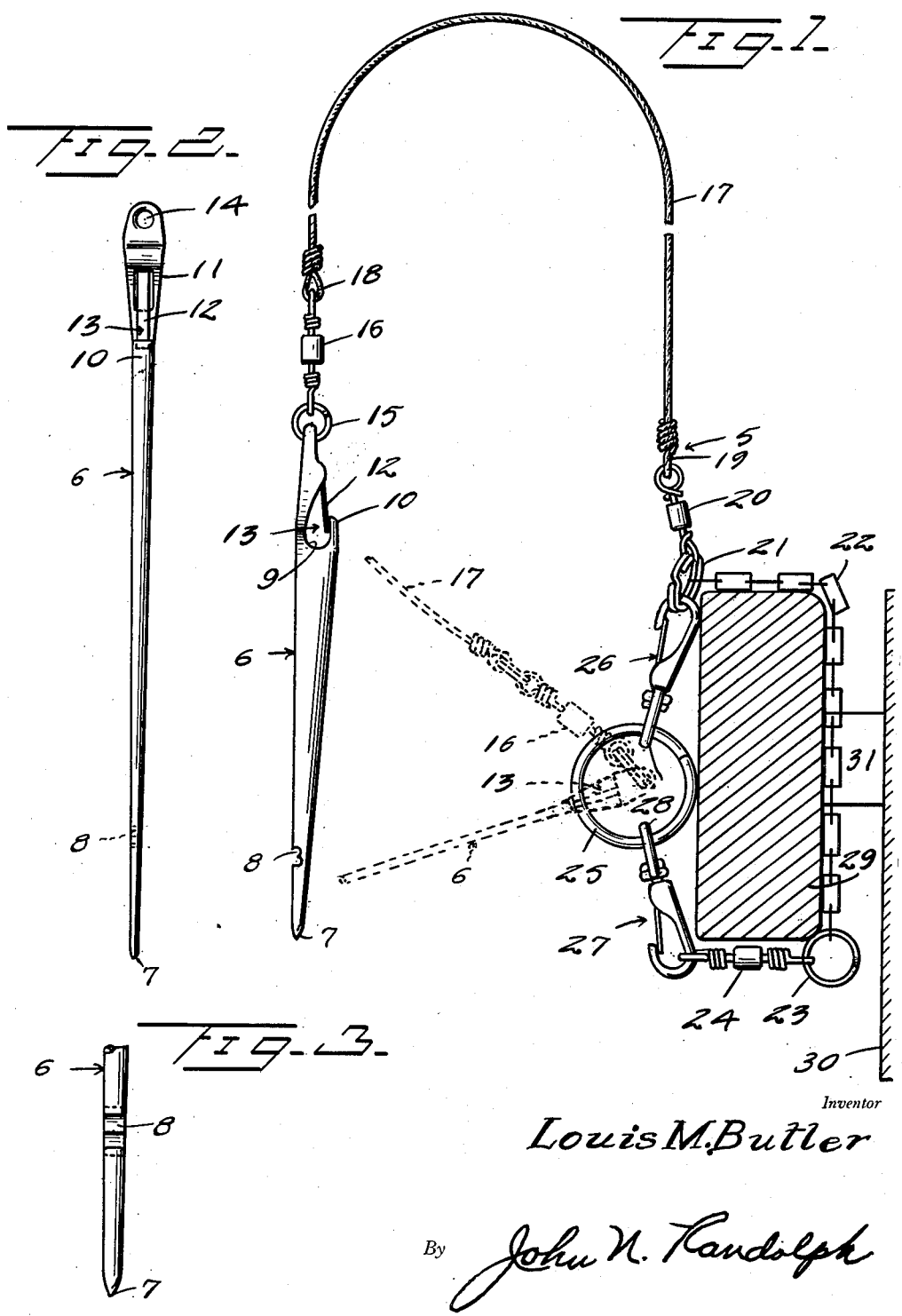
Inventor
Louis M. Butler
By John N. Randolph
Attorney Patented Sept. 30, 1952

2,612,303

UNITED STATES PATENT OFFICE 2,612,303

FISH STRINGER

Louis M. Butler, Sauk Centre, Minn.

Application March 17, 1950, Serial No. 150,173

1 Claim. (Cl. 224—7)

This invention relates to a novel construction of fish stringer which may be readily attached to a seat or brace member of a boat for holding a plurality of fish and which is so constructed that fish may be applied thereto without detaching the stringer from the boat.

Another object of the invention is to provide a fish stringer which may be detached from its connection to a boat without releasing the part of the stringer on which the fish are supported.

Still a further object of the invention is to provide a fish stringer having a novel construction of bar forming a needle to be passed through the gill of a fish and which stringer is so constructed that an end thereof may be released for removing the fish from the end of the stringer remote to the bar or needle.

Various other objects and advantages of the invention will hereinafter become more fully apparent from the folowing description of the drawing, illustrating a presently preferred embodiment thereof, and wherein:

Figure 1 is a fragmentary elevational view showing the fish stringer attached to a part of a boat;

Figure 2 is an edge elevational view on an enlarged scale of the bar or needle, looking from right to left of Figure 1, and Figure 3 is an enlarged fragmentary view looking toward the opposite edge of the outer end of the needle.

Referring more specifically to the drawing, the fish stringer in its entirety is designated generally 5 and includes an elongated, longitudinally tapered bar, designated generally 6 which is preferably oval shaped in cross section and which is provided with a pointed end 7. Adjacent the pointed end 7, one longitudinal edge of the bar 6 is provided with a fishhook disgorging notch 8. Adjacent the opposite end or wider end of the bar 6, said bar is provided with a relatively large notch 9 which is substantially hook-shaped and which opens outwardly of the edge thereof, opposite the edge in which the notch 8 is formed and in a direction away from the pointed end 7. The hook-shaped notch 9 forms a bill portion 10 which extends away from the pointed end 7. Beyond the notch 9 and in the end of the bar 6, remote to the pointed end 7, said bar 6 is provided with a recess 11 in which is anchored one end of leaf spring 12 which extends therefrom into the recess or notch 9 and the free end of which engages under or against the inner side of the bill 10 to combine therewith and with the notch 9 to form a snap hook, designated generally 13. The terminal of the bar 6, remote to the pointed end 7 is provided with an eye 14 to receive a small split ring 15 to which one end of a conventional swivel 16 is detachably connected.

An elongated flexible member such as a cord or thin cable 17 has one end 18 thereof tied to the opposite end of the swivel 16 and its opposite end 19 tied to one end of another conventional swivel 20. The flexible member 17 may be of any desired length, as for example five feet. The opposite end of the swivel 20 is detachably secured to a small split ring 21, which is illustrated in Figure 1 as comprising two normally abutting convolutions and with the ends of the ring 21 spaced from one another, so that the swivel 20 may be readily detached from the ring 21, in a conventional manner. One end of a short length of chain 22 is likewise detachably connected to the ring 21 and is detachably connected at its opposite end to a split ring 23. The rings 15 and 23 are of the same construction as the ring 21. A conventional swivel 24 has one end thereof detachably connected to the ring 23.

A larger split ring 25, of the same construction as the ring 21, has two snap hooks 26 and 27 detachably connected thereto, each of said snap hooks having a swivelly mounted ring or eye 28 which detachably engages the ring 25.

From the foregoing it will be readily apparent that by either disengaging the snap hook 27 from the swivel 24 or the snap hook 26 from the ring 21, that the chain 22 may be positioned around a part of a boat as for example a bracing strip or bar 29 of a rowboat which forms a part of the gunwale and which is supported in spaced relationship to and on the inner side of a side 30 of the boat and by a longitudinally spaced spacing block 31. The disconnected snap hook is then reconnected to either the ring 21 or swivel 24 for securing the fish stringer 5 detachably to the member 29 and with the ring 25 on the inner side of said member 29, as illustrated in Figure 1. When a fish is caught it is applied to the stringer 5 by passing the bar 6, which forms the stringer needle, through the gill and mouth of the fish with the pointed end 7 as the leading end thereof and the ring 15 and swivel 16 are likewise drawn through the gill and mouth to position the fish, not shown, on the flexible member 17. The snap hook 13 is then detachably engaged with the ring 25 and the flexible strand 17 is then thrown outboard of the boat side 30 to support the fish in the water. It will be readily apparent that additional fish may be attached to the stringer strand 17 by disconnecting the snap hook 13 from the ring 25 and repeating the operation, previously described, after which the snap hook 13 is re-engaged with the ring 25. When the fisherman leaves the boat the fish and fish stringer may be removed from the boat without danger of loosing any of the fish by merely disconnecting the snap hook 27 from the swivel 24 so that the fish will still be held in the loop formed by the strand 17, swivels 16 and 20, rings 15 and 21, snap hooks 13 and 26 and ring 25. When it is desired to remove the fish from the stringer 5, it is not necessary to pass the fish back over the stringer needle 6 as the snap hook 26 may then be disconnected from the ring 21 and the fish then removed over the swivel 20, ring 21, chain 22, ring 23 and off of the swivel 24 which is disconnected from the snap hook 27. The notch 8 may be engaged with a fishhook for disgorging it from the mouth or other interior part of a fish.

A chain of the proper length, similar in construction to the chain 22 may be substituted for the flexible member 17 and various other modifications and changes are contemplated and may obviously be resorted to, without departing from the spirit or scope of the invention as hereinafter defined by the appended claim.

I claim as my invention:

A fish stringer comprising an anchoring means engaging flexible member, a fish engaging flexible member, a split ring and swivel detachably connecting adjacent ends of said flexible members, a split ring and swivel connected to the opposite end of the first mentioned flexible member, a ring having a pair of snap hooks connected thereto, one of said snap hooks being detachably connected to the swivel of the last mentioned ring and swivel and the other of said snap hooks being detachably connected to the ring of the first mentioned ring and swivel for detachably securing the first mentioned flexible member to an anchoring means, a tapered bar forming a stringer needle connected to the opposite end of the fish engaging flexible member, and said bar being provided with a snap hook detachably engaging the last mentioned ring.

LOUIS M. BUTLER.

REFERENCES CITED

The following references are of record in the file of this patent:

UNITED STATES PATENTS

| Number | Name | Date |
|---|---|---|
| 1,182,471 | Frost | May 9, 1916 |
| 1,489,194 | Connolly | Apr. 1, 1924 |
| 2,424,658 | Hanson | July 29, 1947 |
| 2,517,761 | Boyer | Aug. 8, 1950 |
| 2,518,915 | Loree | Aug. 15, 1950 |
| 2,519,528 | Williamson | Aug. 22, 1950 |
| 2,567,775 | Loree | Sept. 11, 1951 |